US009725887B2

(12) United States Patent
Mitchell

(10) Patent No.: US 9,725,887 B2
(45) Date of Patent: Aug. 8, 2017

(54) SIPHON AID FOR SIPHONING GREY WATER

(71) Applicant: John Mitchell, San Jose, CA (US)

(72) Inventor: John Mitchell, San Jose, CA (US)

( * ) Notice: Subject to any disclaimer, the term of this patent is extended or adjusted under 35 U.S.C. 154(b) by 0 days.

(21) Appl. No.: 15/043,462

(22) Filed: Feb. 12, 2016

(65) Prior Publication Data
US 2016/0319521 A1 Nov. 3, 2016

Related U.S. Application Data

(60) Provisional application No. 62/155,260, filed on Apr. 30, 2015.

(51) Int. Cl.
*F16L 25/14* (2006.01)
*E03B 1/04* (2006.01)

(52) U.S. Cl.
CPC .............. *E03B 1/042* (2013.01); *F16L 25/14* (2013.01); *E03B 2001/045* (2013.01)

(58) Field of Classification Search
CPC .......... F16L 25/14; E03B 1/041; E03B 1/042; E03B 2001/045
USPC .................................. 141/331–345
See application file for complete search history.

(56) References Cited

U.S. PATENT DOCUMENTS

| | | | | |
|---|---|---|---|---|
| 1,623,260 A * | 4/1927 | Mohn | ........................ | B67C 3/18 137/149 |
| 3,897,808 A * | 8/1975 | Stewart, Jr. | ............. | G01F 11/00 141/323 |
| 4,273,166 A * | 6/1981 | Bradley | ................... | B67C 11/02 141/297 |
| 4,600,125 A * | 7/1986 | Maynard, Jr. | ............. | B67B 7/28 141/330 |
| 6,412,528 B1 * | 7/2002 | Alex | ....................... | B67D 7/007 137/123 |
| 7,264,027 B2 * | 9/2007 | Rosenbaum | ........ | F01M 11/0408 141/338 |
| 7,635,013 B2 * | 12/2009 | Ballinger | ................. | B67C 11/00 141/331 |
| 8,561,658 B2 * | 10/2013 | Kightly | ................. | B09B 3/0058 141/231 |
| 2006/0185763 A1 * | 8/2006 | Rosenbaum | ........ | F01M 11/0408 141/338 |
| 2012/0042964 A1 * | 2/2012 | Kightly | ................. | B09B 3/0058 137/318 |
| 2012/0242082 A1 * | 9/2012 | Larsen | .................... | A01G 25/00 285/148.19 |
| 2013/0284315 A1 * | 10/2013 | Enghard | ................. | B67C 11/02 141/331 |

(Continued)

*Primary Examiner* — Nicolas A Arnett
(74) *Attorney, Agent, or Firm* — John Chandler

(57) ABSTRACT

Disclosed herein is a device for facilitating siphoning of greywater (graywater) or gently used water. An adapter is designed to fit onto the end of a hose or tube. The adapter is manually held tightly or attached by friction to a spigot or faucet. The faucet is turned on and running water primes the hose. The adapter is then placed under the surface of a collection of greywater in a sink, tub, clothes washer and the like. Greywater is then allowed to flow to a garden, lawn, cistern or other place where the greywater can be put to use instead of shunting it into a sewer. The device includes a funnel-shaped portion and a threaded portion. The device is made from a pliant material such as a silicone rubber or plastic.

19 Claims, 4 Drawing Sheets

(56) References Cited

U.S. PATENT DOCUMENTS

2014/0041749 A1* 2/2014 Kightly ................... B67D 7/06
141/1

\* cited by examiner

SIPHON AID FOR SIPHONING GREY WATER

This application claims priority to, and the benefit of, U.S. provisional patent application filed on 30 Apr. 2015 and having Ser. No. 62/155,260.

BACKGROUND

Field

The present invention relates generally to faucet adapters for attaching a hose or tube, and more specifically to a faucet attachment to increase efficient use of grey water.

Related Art

In many parts of the world, there is a shortage of water. In many communities, people waste under-used water by sending it down the drain. The term grey water or greywater has been coined to label gently used water. Greywater includes gently used water collected in bathroom sinks, showers, tubs, washing machines and the like. A large portion of greywater comes from bathing and showering where otherwise potable water is put to a very short-term use before passing into a drain. Millions of gallons are lost from ordinary and daily household tasks. Of course there are contaminated household waters, termed blackwater, that should be sent down a sewer drain or collected in a septic tank, and treated prior to releasing it back to nature. In contrast, greywater can be put to other uses rather than discarding it down a sewer drain.

Greywater may be put to further use by delivering it to gardens, flowerbeds, lawns, car washes and landscapes and the like. The problem is getting the greywater from collection places to the place of actual use. Ordinarily, kitchen sinks, bathroom sinks, toilets and household appliances have a single outlet to a sewer system. Substantial greywater is thereby discarded into pipes and treated as blackwater because there is no easy mechanism for transporting greywater to another place of use near a household. At the point greywater meets blackwater, the greywater is lost by becoming irreversibly contaminated.

There is a substantial opportunity to make better use of water across the planet including transporting greywater to places that can use it. Until household fixtures and appliances can properly accommodate greywater, there is a substantial need for better ways to take advantage of wasted greywater.

SUMMARY

Embodiments and techniques described herein relate to an inexpensive device for making productive use of greywater. According to one implementation, an adapter is provided that can be temporarily and easily attached to a water spigot or faucet for priming a hose or tube. Subsequently, greywater can be siphoned from its holding vessel such as a sink, tub, clothes washer and the like to a garden, lawn, cistern or other place where the greywater can be put to use.

According to various embodiments described, a device includes a funnel-shaped portion that easily and removably mates to a water faucet and a threaded portion for attaching a typical garden hose, water hose or tube. In operation, the hose or tube is primed with a small amount of tap water from the faucet. Subsequently, the device attached to the working end of the hose is placed into the reservoir of greywater and the greywater is allowed to pass to a desired location. The device is preferably made from a resilient and flexible material such as a silicone rubber, plastic or other pliant material. The material simultaneously gives sufficient strength to the device and the flexibility to fit tightly over the end of the faucet. The material can be used for years without impact to the faucet and without wear to the device. The device is easy to clean and maintain.

This summary is provided to introduce a selection of concepts in a simplified form that are further described below in the detailed description. This summary is not intended to identify key or essential features of the claimed subject matter, and thus is not intended to be used to limit the scope of the claimed subject matter.

BRIEF DESCRIPTION OF THE DRAWINGS

While the appended claims set forth the disclosure with particularity, the device, together with its objects and advantages, is more readily appreciated from the following detailed description, taken in conjunction with the accompanying drawings. Throughout, like numerals generally refer to like parts. Unless specifically indicated, the components and drawings are not shown to scale.

Figure 1:
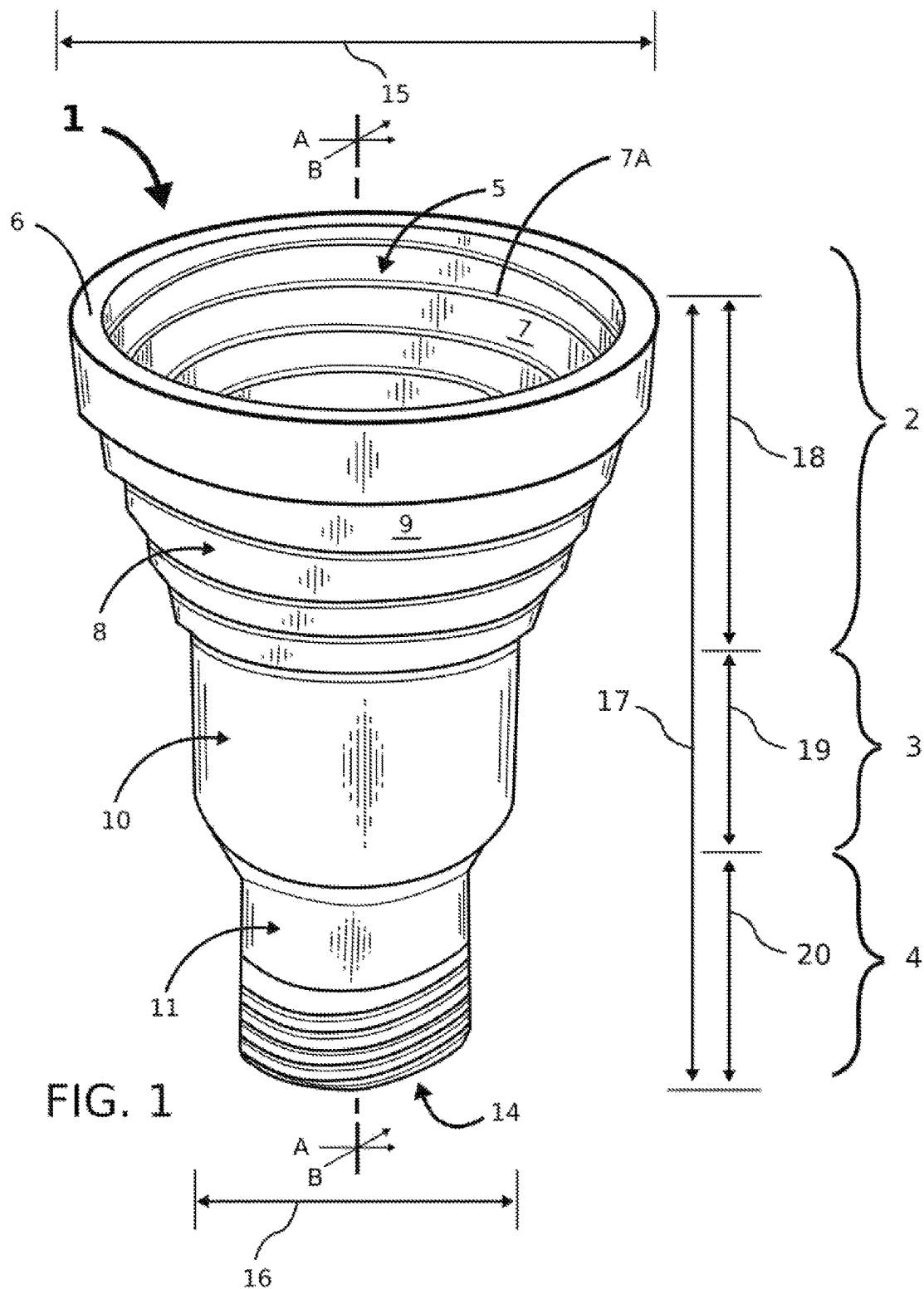
FIG. 1 illustrates a top perspective view of one implementation of the device.

GLOSSARY 1 device according to first illustrated embodiment
2 funnel-shaped section
3 tubular section
4 connection section
5 receiving end
6 top surface or edge
7 inner surface, funnel-shaped section
7A flattened inner surface
8 cascading rings
9 outer surface, funnel-shaped section
10 outer surface, tubular section
10A inner surface, tubular section
11 surface, connection section
11A inner surface, connection section
12 connection surface
13 threads, connection section
14 discharge end
15 outer diameter, funnel-shaped section
16 outer dimension, tubular section
17 overall height of device
18 funnel-shaped section height
19 tubular section height
20 connection section height
21 inner discharge diameter

DETAILED DESCRIPTION

Overview. The present disclosure describes a device for use with a tube or garden hose to facilitate siphoning greywater and making better use of greywater. Greywater is alternatively spelled gray water, graywater and grey water.

FIG. 1 illustrates a top perspective view of one implementation of the device. With reference to FIG. 1, the device 1 includes a funnel-shaped section 2; a barrel, tubular or neck section 3; and a connection section 4. The discharge end of a water faucet or spigot (not shown) is placed into the receiving end 5 of the funnel-shaped section 2. A hose or tube (not shown) is placed into or fastened to the distal or discharge end 14 of the connection section 4. The funnel-shaped section 2 includes a preferably flat outer or top edge or surface 6, an inner surface 7 and an outer surface 9. Preferably, at least the inner surface 7 includes several horizontal or flattened surfaces 7A as the funnel-shaped section 2 progressively narrows from the top or receiving end 5 toward the tubular section 3. Conceptually, the funnel-shaped section 2 is comprised of a series of cascading rings 8 of progressively smaller diameter. Such arrangement provides a series of flattened surfaces 7A for matting tightly against a surface of the water faucet.

The widest dimension or outer diameter 15 at the receiving end 5 of the funnel-shaped section 2 is preferably over two inches (5.0 cm) wide. This size allows the funnel-shaped section 2 to accommodate most commercially available household faucets, spigots and other water outlets. The outer dimension 16 of the tubular section 3 is at least 1.3 inches (3.5 cm) wide and is preferably uniform in outer diameter along its length. This outer dimension 16 is designed to accommodate a variety of connection sizes and connection materials of the connection portion 4 such as a brass fitting, a hardened plastic fitting, stainless steel fitting and so forth. While the outer diameter of the connection section 4 is shown smaller than the outer diameter 16 of the tubular section 3, such is for sake of illustration only. Further, while the tubular or mid section 3 is shown as cylindrical in shape, other outer and inner profile shapes for the mid section 3 are possible. The tubular section 3 is preferably sized so as to accommodate either a male connector or a female connector of a standard garden hose. A male connector of a garden hose typically has an outer diameter of 1 1/16 inches (27 mm).

Although not shown in this figure, the outer surface 9 of the funnel-shaped section 2 may include a texture to facilitate manual gripping of the funnel-shaped section 2. For example, a set of divots or raised mounds or grooves may be formed in the outer surface 9. The inner surface 7 of the funnel-shaped section 2 is preferably smooth. Such feature provides several benefits. A smooth inner surface 7 encourages a water-tight seal between the funnel-shaped section 2 and a faucet. Also, a smooth inner surface 7 promotes easy cleaning and maintenance of the device 1. The outer surface 10 of the tubular section 3 is preferably planar and smooth to facilitate a water-tight seal for any tube or hose fitted directly up and onto the barrel portion of the tubular section 3 having an outer diameter 16.

In terms of size, the overall height 17 of the device 1 is preferably over two inches (5.0 cm) tall and may be substantially longer such as 4-5 inches (10-13 cm). The funnel-shaped section height 18 is preferably over 1.25 inches (3.2 cm) tall, and the tubular section height 19 is preferably at least one inch (2.5 cm) tall. The connection height 20 may be of any length depending on the type of connection form needed. As illustrated, the connection portion 4 is at least approximately one inch (2.54 cm) in height 20 to accommodate adequate an adequate amount of male threads at the discharge end 14.

Figure 2:
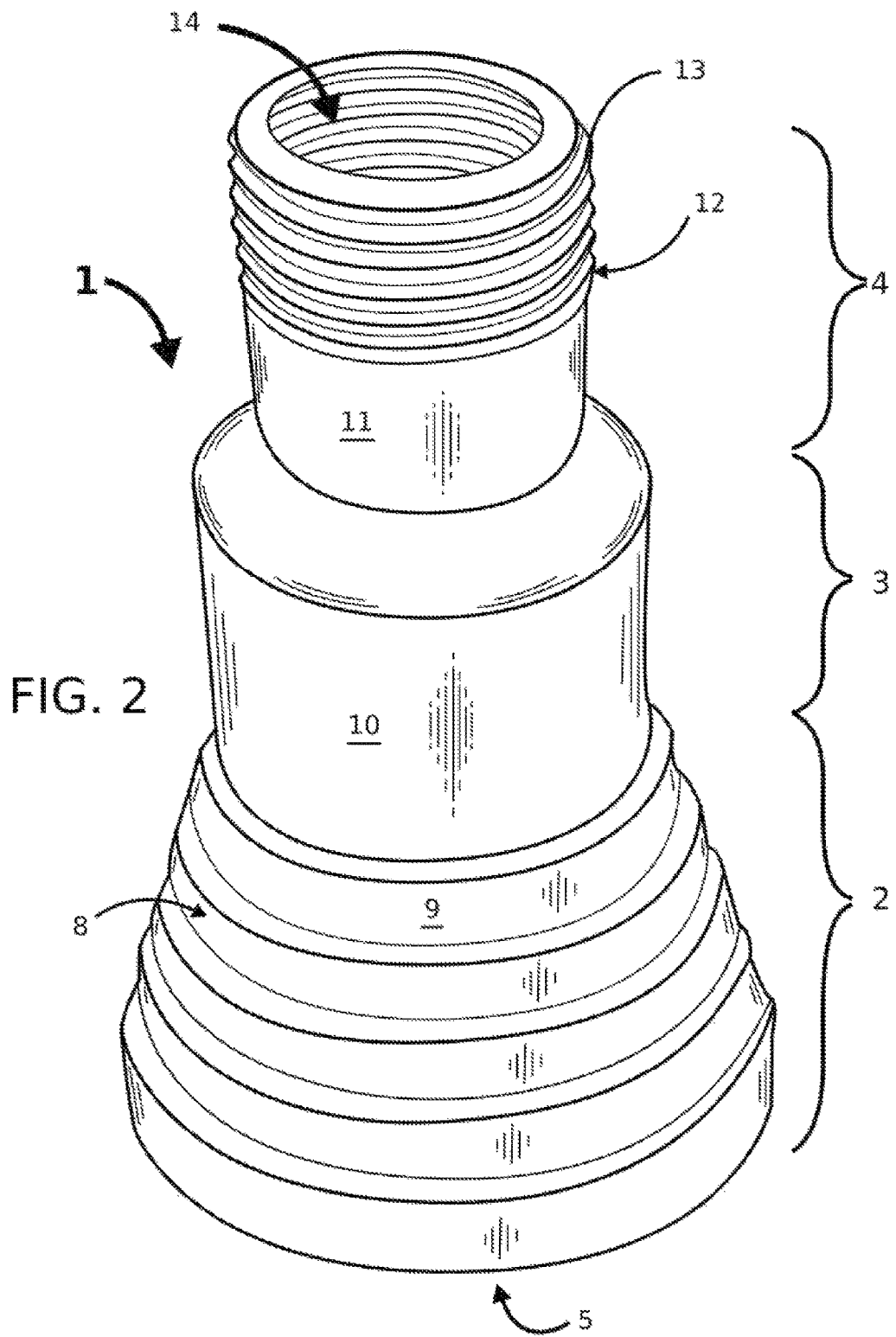
FIG. 2 illustrates a bottom perspective view of the device of FIG. 1.

FIG. 2 illustrates a bottom perspective view of the device of FIG. 1. With reference to FIG. 2, the cascading rings 8 of the funnel-shaped section 2 progressively widen at each step downward to the receiving end 5 of the device 1. Threads 13 are formed in surface 12 or of the material of the connecting portion 4. As illustrated, male threads 13 are available for receiving a female connector of a hose (not shown). According to a preferred implementation, the connection section 4 includes a set of threads 13 in a brass or plastic fitting that is molded into the tubular section 10 or distal end of the material of connection section 4. Such fitting and threads 13 provide a solid discharge end for receiving the hose. The threads 13 prevent a hose from slipping off of the device 1 under pressure from water discharging from a faucet placed into the receiving end 5. Further, the threads 13 may be part of a metal barrel that is molded onto or to the connection section 4. Preferably, for a metal barrel, the threads 13 are made of a brass, zinc-coated copper fitting or some other type of metal that resists corrosion.

Figure 3:
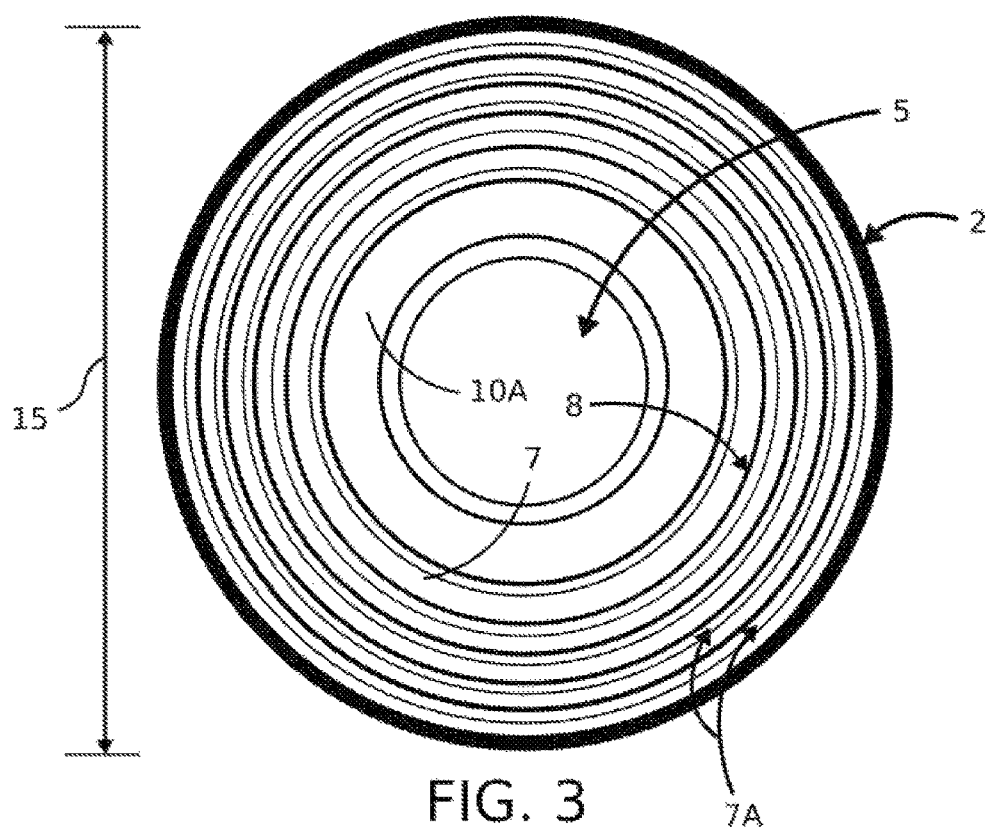
FIG. 3 illustrates a top view of the device first shown in FIG. 1.

FIG. 3 illustrates a top view of the device of FIG. 1. With reference to FIG. 3, the funnel-shaped section 2 dominates the figure. The receiving end 5 includes a smooth inner surface 7. Several flattened, substantially horizontal surfaces or shoulders 7A are visible. Depending on the application, a user is able to tear or cut away some or all of one or more of the cascading rings 8 from the end 5 of the device 1—such as along a seam at a shoulder 7A—so that the outer diameter 15 and shape of the funnel-shaped section 2 exhibit a final desired size 15 and shape depending on the particular application of the device 1 for a particular faucet or source of priming water. Preferably, the material composition and wall thickness of the funnel-shaped section 2 are chosen such that such modification can be done with few or no cutting tools. At the most inner portion of the figure, portion of the inner surface 11A of the tubular section 3 is visible. The inner surface 11A may be perpendicular into the plane of the figure, or it may slope from the inner diameter of the last ring 8 to the inner diameter of the connection section 4.

According to an alternative embodiment, at least the inner shape of the funnel-shaped section 2 is designed and shaped to exactly match the distal end of a faucet so that the inner surface 7 of the funnel-shaped section 2 mates in a water-tight fashion with the particular faucet. Thus, in use, the funnel-shaped section 2 may be held tightly and frictionally onto the end of the faucet without a need for manually holding the device 1 onto the faucet when priming a hose with water from the faucet. Grooves, lips or other surface feature may be designed into the surface 7 of the funnel-shaped section 2. For example, a square-shaped faucet may match up with a square-shaped funnel-shaped section.

Figure 4:
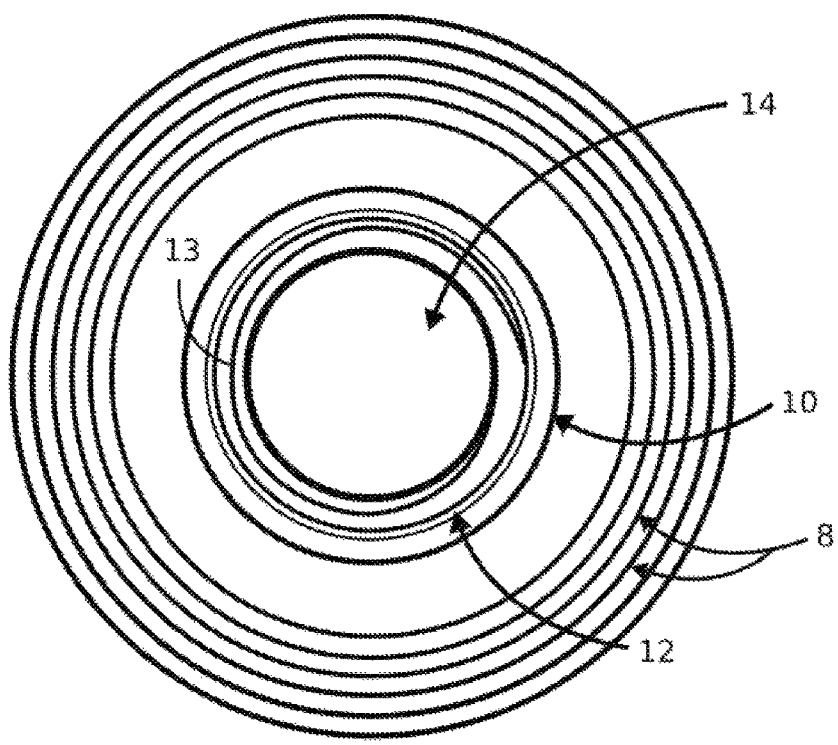
FIG. 4 illustrates a bottom view of the device first shown in FIG. 1.

FIG. 4 illustrates a bottom view of the device first shown in FIG. 1. With reference to FIG. 4, the discharge end 14 of the device 1 is visible. The outer edge of the tubular section 10 is visible toward the center of the figure. Cascading rings 8 of the funnel-shaped section expand outward from the tubular section 10. The surface 12 of the connection section 4 includes threads 13. The threads 13 are male threads and are more plainly visible in other figures.

Figure 5:
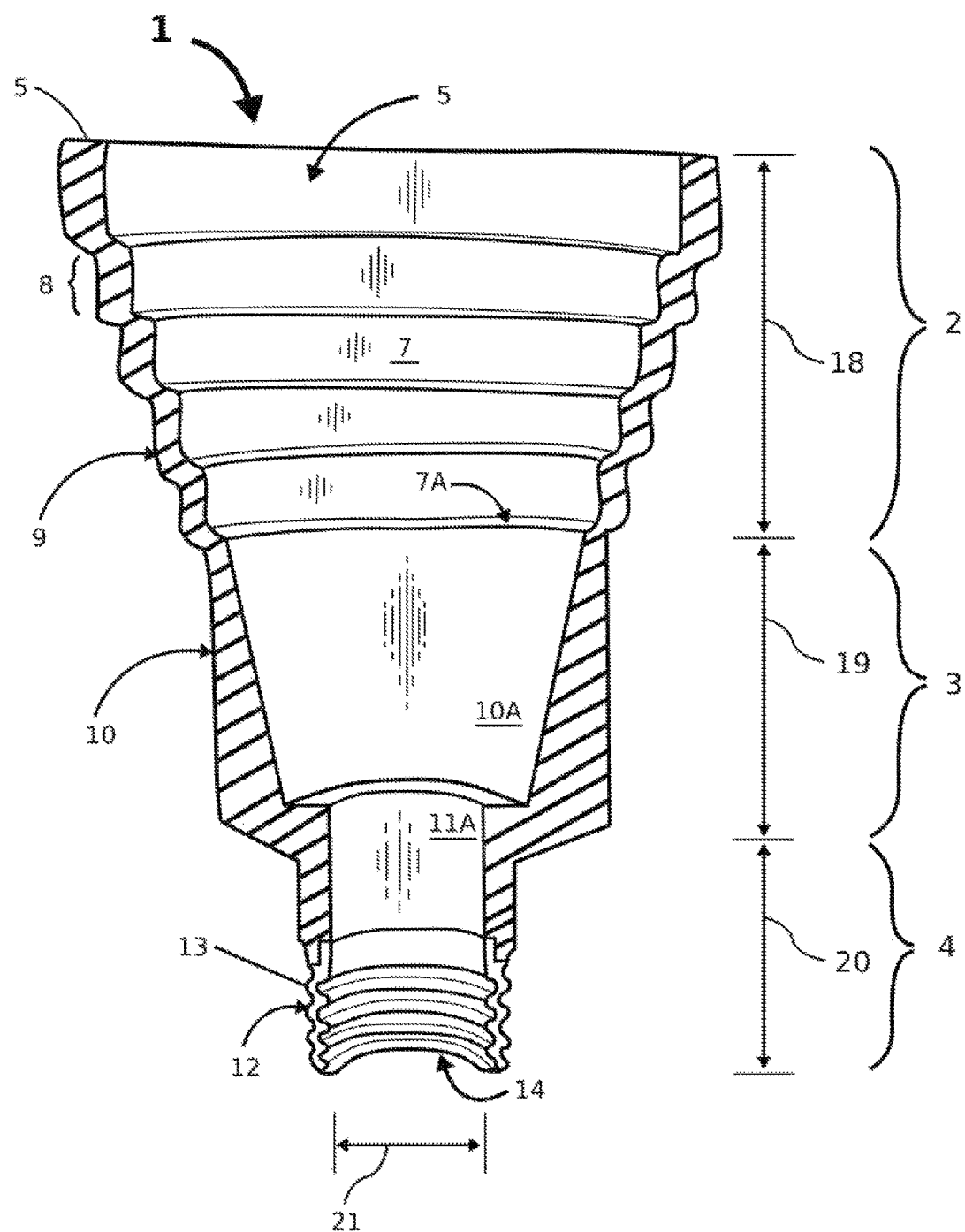
FIG. 5 illustrates a cross-sectional view of the device first shown in FIG. 1 along line A-A.

FIG. 5 illustrates a cross-sectional view of the device first shown in FIG. 1 along line A-A. A view along line B-B would be substantively equivalent to the view along A-A and is not show for sake of simplicity in explanation. With reference to FIG. 5, the funnel-shaped section 2, tubular section 3 and connection section 4 are visible. A discharge end of a water faucet or spigot (not shown) is placed into the receiving end 5 of the funnel-shaped section 2. A hose or tube (not shown) is placed onto, into or threaded onto or into the distal or discharge end 14 of the connection section 4. The funnel-shaped section 2 includes a flat outer edge or surface 6, an inner surface 7 and an outer surface 9. Preferably, at least the inner surface 7 includes several horizontal or flattened surfaces 7A for butting flatly against a surface at an end of a spigot or faucet so as to create a substantially water-tight seal between the spigot and device 1. A series of cascading rings 8 progressively become smaller in diameter from the receiving end 5 to the discharge end 14 to accommodate different sizes and shapes of faucet.

The funnel-shaped section height 18, tubular section height 19 and connection section height 20 are illustrated. These heights 18, 19, 20 are approximately the same in length relative to each other in this embodiment of the device 1. The body 10 of the tubular section 3 extends vertically. The inner surface 10A of the tubular section is illustrated as smooth. The inner lumen of the tubular section 3 narrows from the top to the entrance to the connection section 4. The inner surface of the connection section 11A is shown as smooth. Water enters the receiving end 5 and, in use, passes toward the discharge end 14. The opening at the discharge end 14 has an inner diameter 21 as illustrated.

Conclusion. In the description, for purposes of explanation, numerous specific details are set forth in order to provide an understanding of the disclosure. It will be apparent, however, to one skilled in the art that the device can be formed and used without these specific details. In other instances, structures, devices, systems and methods are shown only in block diagram form in order to avoid obscuring the invention.

Reference in this specification to "one embodiment", "an embodiment", or "implementation" means that a particular feature, structure, or characteristic described in connection with the embodiment or implementation is included in at least one embodiment or implementation of the invention. Appearances of the phrase "in one embodiment" or "in one implementation" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be evident that the various modification and changes can be made to these embodiments without departing from the broader spirit of the description. In this technology, advancements are frequent and further advancements are not easily foreseen. The disclosed embodiments may be readily modifiable in arrangement and detail as facilitated by enabling technological advancements without departing from the principles of the present disclosure.

I claim:

1. A device for aiding in siphoning of grey water, the device comprising:
    a funnel-shaped section made of a flexible material, wherein the funnel-shaped section includes a continuous, liquid-tight interior surface and an exterior surface, wherein the funnel-shaped section includes a first wide end and a second narrow end, the funnel-shaped section progressively narrowing from the first wide end to the second narrow end, and wherein an internal cross-sectional area defined by the funnel-shaped section from the first wide end to the second narrow end successively narrows through a series of cascading steps formed in at least the inner surface thereby providing a series of flat surfaces on the interior surface to facilitate mating of the inner surface of the funnel-shaped section to a discharge end of a spigot;
    a tubular section having a uniform outer diameter and made of the flexible material, the tubular section extending from the second end of the funnel-shaped section to a discharge end, the tubular section having a smooth inner surface and a tapering inner diameter, the tubular section narrowing from a diameter of the second narrow end of the funnel-shaped section to a tubular section discharge diameter; and
    a connection section extending from the discharge end of the tubular section to a distal end and having a uniform inner diameter along at least a portion of the connection section, wherein a diameter of the distal end is sized for receiving an end of a hose, and wherein the connection section includes an inner surface and an outer surface.

2. The device of claim 1, and wherein the outer surface of the funnel-shaped section is cascaded in stepped fashion concomitantly with the inner surface of the funnel-shaped section such that a thickness between the interior surface and the exterior surface is uniform from the first wide end to the second narrow end, and wherein the tubular section narrows uniformly from the diameter of the second narrow end of the funnel-shaped section to the tubular section discharge diameter.

3. The device of claim 1, and wherein a cross-sectional shape of the funnel-shaped section is circular.

4. The device of claim 1, wherein a wall thickness of the flexible material is thinner at a seam between successive rings.

5. The device of claim 4, wherein the inner surface of the connection section includes threads formed therein for receiving a male-threaded end of the hose, and wherein wall material at each seam between successive rings is made of a different material than the flexible material.

6. The device of claim 5, wherein the threads of the inner surface of the connection section include a lining made of metal, and wherein the metal threads are molded to the connection section.

7. The device of claim 1, wherein the outer surface of the connection section includes threads formed therein for receiving a female-threaded end of the hose.

8. The device of claim 7, wherein the thread portion of the outer surface of the connection section is made from a metal tube, and wherein the metal thread portion is molded to the connection section.

9. A device for priming a siphoning hose, the device comprising:
    a tapered section made of a flexible material and having a wide first end and a narrow second end, wherein the tapered section includes a continuous interior surface and an exterior surface and a wall thickness therebetween, wherein the tapered section successively narrows, from the first end to the second end, through a series of cascading steps formed in the inner surface thereby providing a series of flat surfaces on the interior surface for mating the tapered section to an end of a faucet, and wherein the wall thickness of the flexible material is thinner at a seam between successive cascading steps; and
    a tubular section having an inner surface and an outer surface and extending from the second end of the tapered section to a distal discharge end of the device, wherein the distal discharge end is sized for receiving an end of the siphoning hose.

10. The device of claim 9, wherein the tapered section and the tubular section are made from a same material, and wherein the tapered section and the tubular section are formed with a single mold.

11. The device of claim 9, wherein the tapered section and the tubular section are made from a silicone rubber.

12. The device of claim 9, and wherein the tapered section and the tubular section are made from a material having a durometer Type A value between 60 and 90.

13. The device of claim 9, wherein the tapered section is made from a pliant material and the tubular section is made from a plastic.

14. The device of claim 9, further comprising a threaded metal adapter mounted to the distal discharge end of the tubular section for receiving a threaded hose connector.

15. The device of claim 14, wherein the threaded metal adapter is a male adapter with an outer diameter of 1 1/16 inches (26.99 mm).

16. The device of claim 14, wherein the threaded metal adapter is made from a brass.

17. The device of claim 9, and wherein a cross-section of the tapered section is a frustroconical shape.

18. The device of claim 17, wherein an outer diameter of the first end of the tapered section is at least 2 inches (50.8 mm).

19. The device of claim 9, and wherein the outer surface of the tapered section includes a texture of raised mounds to facilitate increased friction between a human hand and the outer surface when the device is manually handled, and wherein the inner surface of the tapered section is continuously planar.

\* \* \* \* \*